United States Patent
Valentin-Rumpel

(10) Patent No.: US 10,502,238 B2
(45) Date of Patent: Dec. 10, 2019

(54) ELECTROPNEUMATIC POSITIONER AND A FIELD DEVICE HAVING AN ELECTRO-PNEUMATIC POSITIONER

(71) Applicant: SAMSON AKTIENGESELLSCHAFT, Frankfurt (DE)

(72) Inventor: Frank Valentin-Rumpel, Gross-Umstadt (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 127 days.

(21) Appl. No.: 15/794,511

(22) Filed: Oct. 26, 2017

(65) Prior Publication Data
US 2018/0112682 A1 Apr. 26, 2018

(30) Foreign Application Priority Data
Oct. 26, 2016 (DE) .................... 20 2016 106 017 U

(51) Int. Cl.
*F16K 31/02* (2006.01)
*F15B 5/00* (2006.01)
(Continued)

(52) U.S. Cl.
CPC ............... *F15B 5/006* (2013.01); *F15B 9/09* (2013.01); *F15B 13/0803* (2013.01);
(Continued)

(58) Field of Classification Search
CPC ........ F15B 5/006; F15B 9/09; F15B 13/0803; F15B 21/08; F15B 13/0807; F15B 19/005;
(Continued)

(56) References Cited

U.S. PATENT DOCUMENTS

| | | | | |
|---|---|---|---|---|
| 4,481,451 A | * | 11/1984 | Kautz | G05D 3/14 236/49.3 |
| 5,431,182 A | * | 7/1995 | Brown | G05B 6/05 137/487.5 |
| 5,934,169 A | * | 8/1999 | Regel | G05D 16/2095 91/361 |
| 6,112,638 A | * | 9/2000 | Loechner | F15B 9/09 137/85 |

(Continued)

FOREIGN PATENT DOCUMENTS

| | | |
|---|---|---|
| DE | 103 16 129 A1 | 10/2004 |
| DE | 102012021387 B3 | 2/2014 |
| DE | 10 2015 007 147 A1 | 12/2016 |

OTHER PUBLICATIONS

German Search Report dated Jul. 14, 2017 for DE 20 2016 106 017.6.

*Primary Examiner* — Minh Q Le
(74) *Attorney, Agent, or Firm* — Schiff Hardin LLP

(57) ABSTRACT

An electropneumatic positioner for a pneumatic actuator to operate a control device of a processing plant can include two modular pneumatic slots and a pneumatic control output. The two modular pneumatic slots can engage with a respective modular pneumatic component. The two pneumatic slots and the pneumatic components can be modularly matched to one another such that their respective pneumatic interfaces merge into one another when a pneumatic slot is engaged. The pneumatic control output can output a pneumatic control pressure signal to the pneumatic actuator. The two modular pneumatic slots and the pneumatic control output can form a pneumatic series connection.

19 Claims, 2 Drawing Sheets

Figure 1:
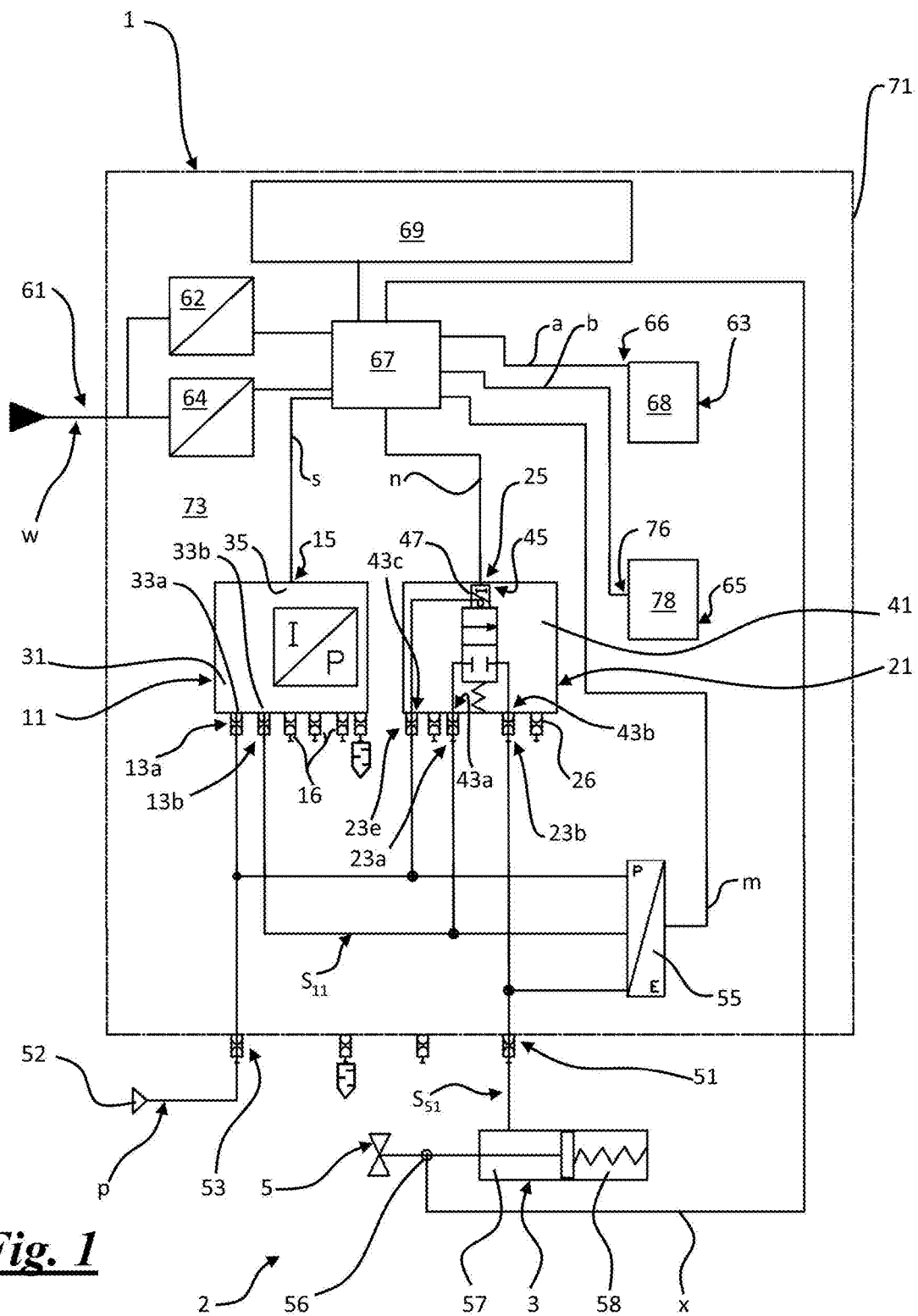

(51) Int. Cl.
*F15B 21/08* (2006.01)
*G05B 19/44* (2006.01)
*F15B 9/09* (2006.01)
*F15B 13/08* (2006.01)
*F15B 19/00* (2006.01)
*F15B 20/00* (2006.01)
*F15B 13/00* (2006.01)

(52) U.S. Cl.
CPC .............. *F15B 21/08* (2013.01); *G05B 19/44* (2013.01); *F15B 13/0807* (2013.01); *F15B 19/005* (2013.01); *F15B 20/00* (2013.01); *F15B 2013/006* (2013.01); *F15B 2211/30515* (2013.01); *F15B 2211/411* (2013.01); *F15B 2211/41572* (2013.01); *F15B 2211/50554* (2013.01); *F15B 2211/5158* (2013.01); *F15B 2211/6306* (2013.01); *F15B 2211/6309* (2013.01); *F15B 2211/6313* (2013.01); *F15B 2211/6336* (2013.01); *F15B 2211/6653* (2013.01); *F15B 2211/6656* (2013.01); *F15B 2211/8855* (2013.01)

(58) Field of Classification Search
CPC .............. F15B 20/00; F15B 2211/6306; F15B 2211/6653; F15B 2211/6336; F15B 2211/6656; F15B 2211/8855; F15B 2211/30515; F15B 2211/411; F15B 2211/41572; F15B 2211/50554; F15B 2211/5158; F15B 2211/6309; F15B 2211/6313; G05B 19/44; F16K 37/0066; F16K 31/42
USPC .......................................... 137/487.5; 91/361
See application file for complete search history.

(56) References Cited

U.S. PATENT DOCUMENTS

| | | | |
|---|---|---|---|
| 6,512,960 B1* | 1/2003 | Schulz | G05B 19/19 137/487.5 |
| 6,519,508 B1* | 2/2003 | Saito | F15B 9/09 137/487.5 |
| 7,421,938 B2* | 9/2008 | Kah | G05B 19/44 91/361 |
| 7,621,293 B2* | 11/2009 | Snowbarger | F16K 37/0091 137/487.5 |
| 7,938,145 B2* | 5/2011 | Phillips | F15B 13/0814 137/884 |
| 8,358,140 B2* | 1/2013 | Somfalvy | F15B 19/005 137/487.5 |
| 8,375,842 B2* | 2/2013 | Kolbenschlag | F15B 11/08 91/361 |
| 8,644,996 B2* | 2/2014 | Inagaki | F16K 37/0066 137/487.5 |
| 8,655,494 B2* | 2/2014 | Boger | G05B 15/02 137/487.5 |
| 8,925,896 B2* | 1/2015 | Nomiyama | F16K 37/0075 137/487.5 |
| 9,500,293 B2* | 11/2016 | Valentin-Rumpel | F15B 5/006 |
| 9,506,482 B2 | 11/2016 | Valentin-Rumpel | |
| 9,880,564 B2* | 1/2018 | Wagner-Stuerz | G05B 15/02 |
| 2009/0199703 A1* | 8/2009 | Hoffmann | F15B 11/028 91/361 |
| 2009/0307405 A1* | 12/2009 | Ottliczky | F15B 13/0853 710/305 |
| 2015/0192931 A1* | 7/2015 | Grumstrup | G05D 16/2066 137/12 |
| 2016/0274593 A1* | 9/2016 | Inoue | G05D 7/0629 |
| 2016/0356396 A1 | 12/2016 | Kah | |
| 2018/0180069 A1* | 6/2018 | Wagner-Stuerz | G05B 9/02 |

* cited by examiner

ELECTROPNEUMATIC POSITIONER AND A FIELD DEVICE HAVING AN ELECTRO-PNEUMATIC POSITIONER

CROSS REFERENCE TO RELATED APPLICATIONS

This patent application claims priority to German Patent Application No. 20 2016 106 017.6, filed Oct. 26, 2016, which is incorporated herein by reference in its entirety.

BACKGROUND

The present disclosure is related to an electropneumatic positioner for a pneumatic actuator for operating a control device, such as a control valve, of a processing plant, for example a chemical plant, such as a petrochemical plant, a food processing plant such as a brewery, a power plant or the like. The present disclosure also relates to an electropneumatic field device having an electropneumatic positioner and a single-acting or double-acting pneumatic actuator for operating a control fitting, such as a control valve, of a process engineering plant.

German Patent Application DE 10 2012 021 387 B3 describes a generic electropneumatic positioner for controlling a pneumatic actuator of a processing plant. The positioner is connected via a pneumatic piping system to the pneumatic actuator. A housing of the positioner accommodates electrical conductors, pneumatic connection lines and a microprocessor. Via an input on the housing of the positioner, the microprocessor receives a target position signal from a control station of the processing plant. The microprocessor is connected to four plug-in or insertion slots with essentially the same structure that are freely accessible from the outside, which can be optionally occupied by four individual electronic and/or pneumatic components of different designs. The slots are adjusted in a modular fashion so that, depending on which predefined electronic component is inserted, the function of the respective electronic and/or pneumatic component is guaranteed by the establishment of electronic and/or pneumatic communication lines. The slots have pneumatic input interfaces which, via a supply line running within the housing, are supplied in parallel with compressed air via the pneumatic field input of a pneumatic supply source. The slots also include electrical interfaces, which are each connected to a microprocessor via electrical lines. Each slot has an output interface via which output signals either of a pneumatic or electrical kind can be delivered at a respective field device output. Based on the reference position signal received by the microprocessor, the microprocessor transfers electrical signals to an I/P-converter, which forwards a pneumatic output signal to a pneumatic actuator via the assigned field output. In one slot of the field device, for example, an electrical output stage can be used to electrically activate an external solenoid valve arranged outside of the field device housing, for example to effect a forced venting. Compared with known positioners without modular slots, thanks to the above described positioner it is possible for the economic effort for the operator of the process engineering plant in terms of functional adjustment and the design of electropneumatic field devices to be reduced substantially. It has been shown, however, that for some, in particular safety-critical positioner applications, a relatively high configuration effort is still required in the functional adjustment and design of the electropneumatic field device.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 2:
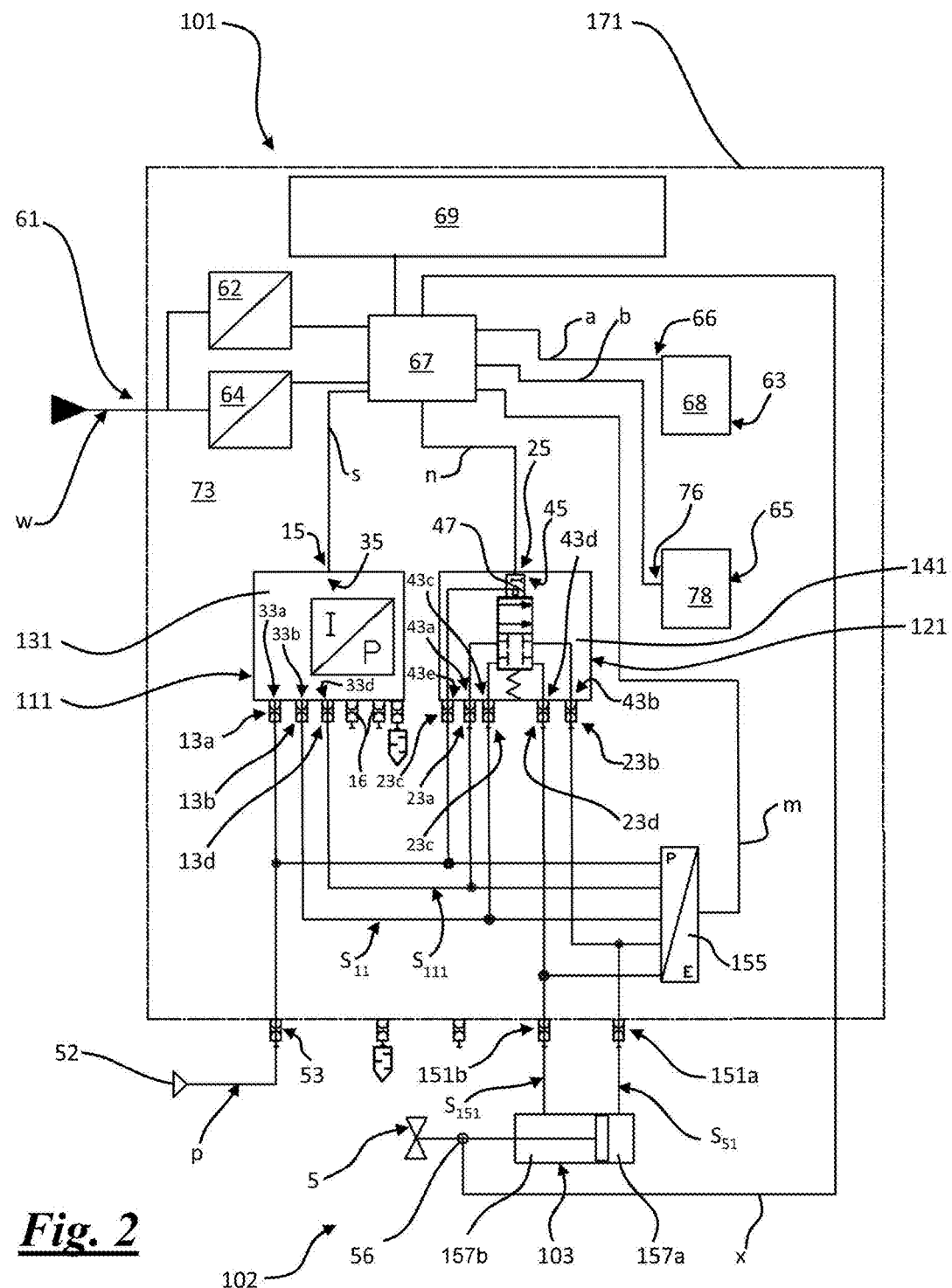

FIG. 1 illustrates a schematic representation of an embodiment of an electropneumatic field device with an exemplary embodiment of an electropneumatic positioner according to the present disclosure; and FIG. 2 illustrates a schematic representation of an embodiment of an electropneumatic field device with another exemplary embodiment of an electropneumatic positioner according to the present disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to improve electropneumatic positioners so that the economic cost for the operator of the process engineering plant in the functional adjustment and design of electro-pneumatic positioners is further reduced, in particular for safety-critical applications.

Accordingly, embodiments of an electropneumatic positioner are provided for a pneumatic actuator to operate a control device, such as a control valve, of a process engineering plant, for example a chemical plant, such as a petrochemical plant, a food processing plant such as a brewery or the like.

The electropneumatic positioner according to an exemplary embodiment of the present disclosure can include at least two modular pneumatic slots for engaging with (or: to be occupied with) one modular pneumatic component each, such as an electropneumatic transducer or the like, wherein the at least two pneumatic slots and the pneumatic components are modularly matched to one another such that their electronic interfaces merge into one another, in a functionally and operationally secure manner, when an electronic slot is engaged (or: occupied). When in the engaging (or: occupying) position in the slot, the pneumatic interfaces of the inserted pneumatic component and the pneumatic interfaces of the pneumatic slot are positioned diametrically opposite one another so that a pneumatic coupling, zero pressure-loss coupling, is established. One modular pneumatic slot is used for receiving a single modular pneumatic component. The modular pneumatic slot is easily accessible in particular from an outer side of the positioner. A modular pneumatic component can be free of electrical inputs and/or outputs.

In particular, a modular pneumatic component can be formed free of any electronics (purely pneumatic component).

In an exemplary embodiment, a modular pneumatic component can include a set of electronics, for example an electropneumatic transducer, such as a current-to-pressure transducer or the like. In an exemplary embodiment, a pneumatic component with electronic components can have one or more electrical interfaces and is designated an electropneumatic component. A slot can be designed as an electropneumatic slot and be modularly matched to an electropneumatic component such that their electronic interfaces merge into one another, in particular in a functionally and operationally secure manner, when an electronic slot is occupied, and in such a way that their pneumatic interfaces merge into one another, in particular in a functionally and operationally secure manner, when the electropneumatic slot is occupied. In an occupied location of an electropneumatic slot the electronic interfaces of the electropneumatic component and the electropneumatic interface of the electropneumatic slot are diametrically opposite one another, so that an electrical contact is established.

In an exemplary embodiment, the electropneumatic positioner can further include at least one pneumatic control output for emitting a pneumatic control pressure signal for controlling the actuator. In an exemplary embodiment, one of the two modular pneumatic slots is occupied with a modular pneumatic component in the form of an I/P-transducer for generating the pneumatic control pressure signal for the actuator. The pneumatic control output can be formed by a pneumatic component in one of the modular pneumatic slots. The modular pneumatic slot is configured to interchangeably receive a single modular pneumatic component from a group of pneumatic components of different functionality while producing a pneumatic connection at the respective pneumatic interfaces, for example one or more electropneumatic transducers, one or more pneumatic connectors in particular with or without throttling, and/or a connector with or without sensors, in particular pressure sensors, temperature sensors or the like. Since the at least two pneumatic components are provided interchangeably on the electropneumatic positioning device according to the present disclosure, the at least one pneumatic slot is configured to be easily accessible from the outside (with respect to a control unit housing). In this way, the electropneumatic positioning device according to the present disclosure has the desired high level of modularity, which a system operator or system builder can use to adjust to changing process conditions of the plant without high installation costs.

According to the present disclosure, the at least two modular pneumatic slots and the at least one pneumatic control output form a pneumatic series connection. The pneumatic series connection can include additional modular pneumatic slots. For example, 2, 3, 4, 5 or more modular pneumatic slots with a pneumatic control output can form a pneumatic series connection. It should be clear that all of the at least two modular pneumatic slots are connected upstream of the pneumatic control output. The pneumatic series circuit begins in the pneumatic fluid-flow direction with a first one of the modular pneumatic slots, which is followed in series by a second modular pneumatic slot connected downstream of it. The pneumatic control output of the electropneumatic positioner is connected downstream in the pneumatic fluid flow direction in series with all of the modular pneumatic slots.

In the case of a position controller with a plurality of modular pneumatic slots, these can be distinguished from each other in terms of being upstream and downstream pneumatic slots. If an electropneumatic positioner has a pneumatic series connection with three or more modular pneumatic slots, the front-most modular pneumatic slot can be designated as the most upstream pneumatic slot, and the rearmost, directly upstream of the pneumatic control output, as the most downstream modular pneumatic slot. Each upstream modular pneumatic slot is always pneumatically further away from the pneumatic control output than the most downstream pneumatic slot. Each downstream pneumatic slot is always pneumatically closer to the pneumatic control output than is the most upstream modular pneumatic slot. The series connection can be supplied with pneumatic compressed air by a pneumatic source. If the series connection is supplied with compressed air from a pneumatic source, an upstream pneumatic slot is always arranged closer to the pneumatic source than a downstream pneumatic slot. Downstream describes the pneumatic fluid flow direction from the pneumatic source to the pneumatic control output, or actuator. Upstream describes the direction from the pneumatic actuator or control output to the pneumatic source.

In exemplary embodiment, the series connection is realized in such a way that between the at least two pneumatic slots, pneumatic channels are provided, for example in the form of a channel plate, pipe channels or the like, to establish a pneumatic connection of two series-connected modular pneumatic slots connected directly one behind the other. If a pneumatic series connection includes three or more modular pneumatic slots, it should be clear that a pneumatic channel connection is always implemented between only two immediately successive pneumatic module slots. In an embodiment of an electropneumatic positioner, the pneumatic interfaces of a pneumatic slot can be pneumatic channel inputs and/or outputs of pneumatic channel connections, in particular a channel plate. The pneumatic control output can be alternatively implemented by a pneumatic component fitted in the most downstream pneumatic slot. In an exemplary embodiment, the electropneumatic positioner includes a pneumatic channel connection between the at least one pneumatic interface of the most downstream pneumatic slot, which is implemented in particular by a channel plate and/or a pipe channel, and the pneumatic control output.

By the modular positioner being equipped in a modular fashion with a series connection of plug-in and replaceable pneumatic modules in a designated and interconnected pneumatic slot, the modular positioner can implement numerous additional functions which are not possible with the known modular positioner, the pneumatic interfaces of the pneumatic slots of which and pneumatic modules arranged therein, including the pneumatic field outputs, are each connected in parallel with one another. Due to the series connection, in particular safety functions can be implemented such that they are integrated in the modular positioner, the implementation of which in the known positioner, as in the case of outdated positioners, requires external components, for example the above-mentioned bleed valve. By being able to provide pneumatic safety components integrated in the electropneumatic positioner, an operator or designer of a process engineering plant can design the system with the positioner more easily and with much lower economic cost.

In an exemplary embodiment of a pneumatic positioner according to the present disclosure, a downstream pneumatic slot of the at least two pneumatic slots is engaged with (or: occupied by) a pneumatic switching device, such as an open/close valve, in particular a 2/2-way valve or a 4/2-way valve, which occupies either a release state, in which it provides a pneumatic connection for transmitting the pneumatic control pressure signal between at least one upstream pneumatic slot of the at least two pneumatic slots and the at least one pneumatic control output, or occupies a locked state in which it seals off the pneumatic connection. In an exemplary embodiment, the switching device occupies an open state or release state in operation, or in the normal operation of the position controller. The locked state can in particular be occupied as a safety position. By the zero-pressure loss closure of the pneumatic connection, the control pressure signal at the at least one pneumatic control output, which can directly downstream of the pneumatic slot occupied by the switching device (e.g. the most downstream pneumatic slot), can be kept constant regardless of the control pressure signal existing upstream of this most downstream slot. The switching device allows, for example, in the event of failure of the pressure source or loss of pressure in the supply pipe leading to the series circuit, a pressure drop at the pneumatic actuator to be prevented, so that, for example, a single-acting pneumatic actuator with spring reset substantially retains its position. It should be clear that, in the case of an electropneumatic positioner with a series connection that contains exactly two modular pneumatic slots, the downstream slot is also the most downstream pneumatic slot and the upstream slot is also the most upstream pneumatic slot. In the case of an electropneumatic positioner whose series connection includes only two modular pneumatic slots except for the pneumatic control output, the downstream pneumatic slot can therefore be connected directly upstream of the pneumatic control output. In the case of a pneumatic positioner whose series connection contains more than two modular slots, it is clear that in each case the most downstream pneumatic slot should not be understood as an upstream pneumatic slot, or that the most upstream pneumatic slot should not be understood as a downstream pneumatic slot. It has been shown that with a generic contemporary pneumatic positioner in particular the safety function "stop actuator" can only be achieved with particular design effort. The usual outer-side flange connection of a solenoid valve to close a control pressure line between a position positioner-side control output and an actuator pneumatically powered by the positioner can cause leakage problems in this control air connection, thereby impairing a safety function of the solenoid valve. For example, in the event of a malfunction in an explosion-hazardous process engineering plant, for example, if the function of the solenoid valve is impaired, an unwanted leakage of the pneumatic air in the direction of the hazardous area can be extremely serious. As the novel electropneumatic positioner allows the modular integration of the pneumatic switching device, the risk of an unwanted leakage downstream of the control output can be considerably reduced.

In accordance with further development of the present disclosure, which can be combined with the previous one, the pneumatic switching device includes a depressurized slider or poppet valve to realize the locking state and the release state. Such locking elements need very little energy to switch from a locking state into a release state and have a short switching time. Alternatively or additionally, to implement the locking state the pneumatic switching device includes at least one soft-sealing sealing component, such as an elastomer seal or a thermoplastic seal, which allows the pneumatic switching device to be leakage-free in the locking state.

In accordance with another further development of the present disclosure, which can be combined with the previous one, the pneumatic switching device is configured to release the pneumatic connection in the release state in such a way that a connection channel of sufficient cross-section is provided in the pneumatic switching device, in particular by means of the slider or the poppet valve, to allow the control pressure signal to pass through un-throttled. In an exemplary embodiment, the cross-section is not more than 20%, not more than 10%, or not more than 5%, greater than required for the control pressure signal to pass through un-throttled. In this embodiment, the pneumatic switching device in the release state can release precisely that cross-section which is just sufficient to prevent a throttling of the control pressure signal from occurring in the switching device, but which is not substantially larger than this just sufficiently opening cross section. The electropneumatic positioner can include an I/P-controller, as a function of which the pneumatic switching device can be proportionally controlled in the release state, for example. For a proportional control of the pneumatic switching device in the release state, for example, the latter can receive, for example, the same electrical control signal as an electropneumatic signal transducer arranged in another, upstream, pneumatic slot that can be configured to emit the pneumatic control pressure signal for controlling the actuator. In such an extension of the present disclosure it has proved advantageous that as a consequence of the adjustment movements of the actuator of the pneumatic switching device in the release state, this is movable even in an emergency. It has also proved advantageous that in the event of a fault, the necessary control path of the locking element and its actuating time is reduced to a minimum, so that the locking state can be reached after an extremely short response time.

In accordance with another embodiment of the present disclosure, which can be combined with one or more other embodiments (e.g. the previous embodiment), the pneumatic switching device can be configured to detect the actual control position of a locking element, such as a slider or valve element, of the pneumatic switching device continuously, for example with a position sensor. Through the detection of the locking element actual position the dynamic behavior can be recorded and measured to obtain information on wear, malfunction or an impending failure.

In an alternative embodiment of the electropneumatic positioner according to the present disclosure, a downstream pneumatic slot of the at least two pneumatic slots can be occupied with an emergency bleed valve, which occupies either a transmission state for providing a pneumatic connection from an upstream pneumatic slot of the at least two pneumatic slots to the pneumatic control output, or else a venting condition, in which the control pressure signal on the pneumatic control output, in particular independently of the control pressure signal at the upstream pneumatic slot, is set at ambient pressure.

In an exemplary embodiment of an electropneumatic positioner according to the present disclosure, the pneumatic switching device (or the bleed valve) is configured to occupy the locking state (or the venting state) as a result of a fault condition or alarm state, in particular of the process engineering plant, of the field device, the positioner, the actuator and/or the control valve. In an exemplary embodiment, the pneumatic switching device is configured to remain in the locking state as long as the fault condition or the alarm condition exists, or until the switching device receives an all-clear signal. A fault or alarm condition can exist, for example, in the event of a pressure drop upstream of the configured to automatically detect a pressure drop in particular at its upstream pneumatic input, in particular its upstream pneumatic interface, and in particular to occupy the locking state as a result of an automatic detection of a pressure drop. Alternatively or in addition, the pneumatic switching device can be configured to occupy the locking state as a result of a pressure drop, pressure measurement and/or undershooting a predefined minimum pressure threshold and/or overshooting a maximum pressure threshold detected by a sensor pressure. In accordance with an alternative design, which can be provided in addition or as an alternative to the above-mentioned designs, the pneumatic switching device can be configured to occupy the locking state as the result of an electrical signal, in particular an electrical emergency signal, such as a fault or alarm condition notified to the positioner or the switching device. For example, the failure of a supply current and/or control current can represent an electrical emergency signal of the electropneumatic positioner.

In accordance with an exemplary embodiment of an electropneumatic positioner, the pneumatic series circuit can only be vented upstream of its at least one pneumatic control output at an upstream pneumatic slot (e.g. exactly one slot) of the at least two pneumatic slots. In an exemplary embodiment, the pneumatic series connection can only be connected to a pressure sink or to the ambient air at an upstream pneumatic slot. For example, a 3/2-way valve in an upstream pneumatic slot can be configured such that the control pressure signal is set to ambient pressure at the downstream pneumatic outputs or at the downstream pneumatic interface of the upstream pneumatic slot. In the normal operation of the modular positioner when using, for example, a switching device which in operation properly occupies a release state in the downstream pneumatic slot, thus also the pneumatic control pressure signal at the control output of the positioner and therefore the pressure in the drive chamber of the actuator connected to the control output can be set to ambient pressure, so that for example in the case of a single-acting pneumatic actuator with spring return, its spring-activated return position can be occupied. In such an electropneumatic positioner, in the event of a power failure the 3/2-way valve or similar moves into its venting position and the pneumatic switching device moves into its locking state, so that the ventilation takes place in the upstream pneumatic slot without any venting of the pneumatic drive chamber of the actuator being carried out.

In an exemplary embodiment of an electropneumatic positioner according to the present disclosure, an upstream pneumatic slot (e.g. the most upstream pneumatic slot of the at least two pneumatic slots) is occupied by an electropneumatic signal transducer, which is configured to emit the pneumatic control pressure signal for controlling the actuator. The electropneumatic signal transducer can receive an electrical control signal, for example from a regulating and/or control electronics such as a microcontroller, a microprocessor, an analogue control electronics, a control room or the like. The electropneumatic signal transducer generates the pneumatic control pressure signal on the basis of the received electrical control signal. The electropneumatic signal transducer implements a modular pneumatic component in the form of a modular electropneumatic component. The electropneumatic control signal transducer, with which the upstream pneumatic slot is occupied, receives an electrical control signal via an electrical interface connection of the modular electropneumatic slot in which the electropneumatic signal transducer is inserted. The control electronics can include processor circuitry configured to perform one or more operations and/or functions of the control electronics.

In accordance with an exemplary embodiment, the electropneumatic positioner can also include a pneumatic supply input for providing a pneumatic supply pressure signal to the pneumatic series connection. In exemplary embodiment, the pneumatic supply pressure signal is supplied from a pneumatic source. The pneumatic supply pressure signal can be, for example, a pressure of 6 bar, 10 bar or more.

In accordance with an exemplary embodiment, which may be combined with one or more other embodiments, (e.g. the previous embodiment), the electropneumatic positioner can further include at least one electrical field input for receiving a supply current and/or an electric control signal, such as a control current, in particular a 4.20 mA control signal, for actuating an electropneumatic signal transducer which may be inserted in an upstream pneumatic slot. A fault condition for initiating the locking state of any pneumatic switching device that may be provided can be detected by an electronic component of the positioner and/or a control electronics, such as a micro-controller, of the position controller and communicated to the electropneumatic switching device, for example if the supply current at the power supply input and/or the electrical control signal at the input field fails or falls below a predefined threshold value.

In an exemplary embodiment of the present disclosure, the electropneumatic positioner also includes at least one modular electronics slot, (e.g. two, three or more modular electronics slots) for occupation by, in each case, one modular electronics component, such as a sensor, in particular a binary position sensor, a binary electronic signal input and/or output or the like. The at least one modular electronic slot and the electronic component are modularly matched to one another in such a way that their electrical interfaces merge into one another when the electronic slot is occupied. In exemplary embodiment, an electronic component is implemented as a pure electronic component free of pneumatic function elements. In particular, an electronic slot is implemented without any pneumatic interfaces or designed such that when inserting a (pure) electronic component any and all pneumatic interfaces of the slot are sealed or closed off in a pressure-lossless manner. In exemplary embodiment, the electronic slot is implemented as a pure electronic slot free of electropneumatic interfaces. In exemplary embodiment, the positioner includes an electrical connection between a positioner electronics, in particular a control electronics, and the electrical interface or interfaces of the electronic slot for communication with the inserted electronic component. An electronic component can be, for example, a modularly designed emergency-shut-off control signal that causes a positioner electronics to send a venting signal and/or emergency state control signal to the pneumatic slots and/or the pneumatic components. For example, by receiving an emergency activation signal as a result of a signal received by a modular emergency activation control signal input inserted in the electronic slot, a pneumatic switching device can be transferred into the safety state or locking state. To assign the electronic slots, in exemplary embodiment, a group of at least two modular electronics components of different functionality is provided, for example including a data memory, an electrical signal input and/or a microprocessor or the like.

In accordance with an exemplary embodiment of the present disclosure, the electropneumatic positioner can include at least one further pneumatic slot, provided in particular with respect to a pressure source in parallel with the series connection, and/or at least one further series connection, which includes at least two pneumatic slots and at least one other pneumatic control signal output. At least one additional pneumatic series connection with at least one pneumatic control signal output can be provided for actuating an additional pneumatic actuator, in particular of a second pneumatic actuator. In an exemplary embodiment of an electropneumatic positioner according to the present disclosure having an additional series circuit, which with respect to a pneumatic source input is connected in parallel with the first series circuit, by means of the pneumatic control signal output of the first series circuit and the other control signal output of the second series circuit, one of two pneumatic drive chambers acting in opposing directions of a pneumatically double-acting actuator can be actuated.

In accordance with an exemplary embodiment, which can be combined with the previous ones, an electropneumatic positioner can also have at least one pressure sensor (e.g. one pressure sensor each) to detect at least one actual pressure value (e.g. a plurality of actual pressure values) in the pneumatic series circuit. One or a plurality of pressure sensors can measure an actual pressure value in particular at the downstream beginning, in the middle, and/or at the upstream end of the pneumatic series connection. At least one pressure sensor (e.g. one pressure sensor each) is provided to detect the control pressure signal at the control output of the pneumatic series circuit and/or for detecting the control pressure signal in the pneumatic series connection between an upstream pneumatic slot and a downstream pneumatic slot of the at least two pneumatic slots and/or for detecting any supply pressure signals that may be present at any pneumatic supply input of the pneumatic series circuit. In the case of an electropneumatic positioner with more than two series-connected pneumatic slots, a pressure sensor can be provided between two pneumatic slots directly pneumatically connected in series. In the case of a pneumatic positioner with a plurality of series circuits, one or a plurality of pressure sensor(s) can be arranged in each of the different pneumatic series circuits.

In accordance with an exemplary embodiment of the present disclosure, which can be combined with the previous ones, the electropneumatic positioner includes a housing that has the at least one pneumatic control output and in which the series circuit(s) is housed, including the two modular pneumatic slots of the series circuit. The at least two pneumatic slots and any other pneumatic or electronic slots can be implemented by a cavity or recess, each in a housing wall of the positioner. In this cavity, the electronics or pneumatic component can be retained by means of a form-fit. In exemplary embodiment, a pneumatic or electronic slot has a docking mechanism, which includes a form-fitting and/or force-fitting device such as a latching device, in particular a manually operable clip or screw connection, for releasably securing the respective electronic or pneumatic component in the modular slot. In exemplary embodiment, the form-fitting and/or force-fitting device can be configured to communicate a pre-loading of the respective plug-in component, so that the respective electrical and/or pneumatic interfaces of the electronic or pneumatic slot and the inserted component are pressed against one another to produce the electrical contact or pneumatic connection. In exemplary embodiment, the housing can be closed (e.g. in a fluid-tight, dust-tight and/or gas-tight manner). In a first compartment the housing can accommodate an in particular permanently installed positioner electronics, in particular a set of open-loop or closed-loop control electronics. In an exemplary embodiment of the present disclosure, the at least two modular pneumatic slots and any other existing pneumatic and/or electronic slots are installed on an outer wall of the housing or a partition of the compartment, in such a way as to ensure that an operator has manual access to the at least two pneumatic slots. The at least two modular pneumatic slots, and in particular any other slots, can be closed off in a fluid-tight manner using a removable housing part, such as a cover, in particular to form a second housing compartment.

In an exemplary embodiment, the housing includes the electrical field input that may be provided and/or any pneumatic supply input provided. In particular, any modular electronics slots provided are accommodated in the housing.

The present disclosure also relates to an electropneumatic field device, which includes an electropneumatic positioner according to the present disclosure, which in particular can be configured in accordance with one or more of the above described embodiments or extensions, and also the at least one, in particular, single-acting or double-acting, pneumatic actuator that is connected to the at least one pneumatic control output. A double-acting pneumatic actuator can, for example as described above, be activatable by an electropneumatic positioner according to the present disclosure. Alternatively, one pneumatic drive chamber of a double-acting pneumatic actuator can be actuated with an electropneumatic positioner according to the present disclosure and the other pneumatic working chamber of the pneumatic actuator with a second electropneumatic positioner according to the present disclosure or a different one.

In an exemplary embodiment of an electropneumatic field device, the pneumatic field device upstream of the at least one pneumatic actuator is operationally ventable exclusively at an upstream pneumatic slot. In this example, the control output of the control device according to the present disclosure of the electropneumatic field device is connected to the pneumatic actuator in such a way that in the normal operation of the field device essentially no pressure loss takes place between the pneumatic control output and the working chamber of the pneumatic actuator. In an exemplary embodiment, the electropneumatic field device is configured in such a way that the at least one pneumatic actuator can be operationally vented exclusively using the electropneumatic positioner which is pneumatically connected to the actuator.

FIG. 1 illustrates an electropneumatic positioner 1 according to an exemplary embodiment of the present disclosure. In an exemplary embodiment, the electropneumatic positioner 1 is part of an electropneumatic field device 2. A field device 2 can be configured to control a process fluid flow of a process engineering plant (not shown in detail) such as a petrochemical plant, a food processing plant such as a brewery or the like. In an exemplary embodiment, the electropneumatic field device 2 includes the electropneumatic positioner 1 and a single-acting pneumatic actuator 3 connected thereto.

As explained in more detail below, the electropneumatic positioner 1 can include a first modular pneumatic slot 11 and a second modular pneumatic slot 21 pneumatically connected in series with the first slot 11, and a pneumatic control output 51 pneumatically following the series-connected pneumatic slots 11, 21 for emitting a pneumatic control pressure signal S51 to the actuator drive 3.

In an exemplary embodiment, but not limited hereto, no pneumatic or electropneumatic function elements are arranged between the pneumatic control output 51 and the actuator 3, or its pneumatic working chamber 57, which could cause a venting of the pneumatic working chamber 57 of the pneumatic actuator 3. In this respect, the pneumatic control signal or control pressure signal S51, which is emitted at the control output 51, can be fed unimpeded and unaffected to the pneumatic working chamber 57 of the actuator 3. The actuator 3 is mechanically connected to an actuator valve 5, shown as an example design of an essentially arbitrary control fitting, via a spindle or shaft. An in exemplary embodiment, mechanically and/or electrically operating position sensor 56 detects the instantaneous position x of the control valve 5.

The position sensor 56 delivers a position signal to a position controller electronics 67, such as a microprocessor or microcontroller, which is accommodated in an inner chamber 73 of a housing 71 of the actuator 1. Via an electrical field input 61 on the field device housing 71, the positioner electronics 67 receives a reference control signal w from a control station, not shown in detail, of the process engineering plant. The positioner electronics 67 can generally be referred to as controller 67. In an exemplary embodiment, the positioner electronics 67 can include processor circuitry configured to perform one or more operations and/or functions of the positioner 1 electronics 67.

This reference control signal w, which the positioner 1 receives at the electrical field input 61, can be a digital and/or analogue signal. If the control and/or regulation electronics 67 of the positioner 1 is implemented as a microcontroller, an analogue-digital converter 64 can be provided between the electric field input 61 and the microcontroller 67 to prepare an analogue reference control actuating signal, for example a 4.20 mA signal, for the open-loop and/or closed-loop control electronics 67. Alternatively or additionally, between the field input 61 of the positioner 1 and the control and/or regulation electronics 67, one (or a plurality of) additional communication block(s) 62 can be provided, for example for HART communication, field-bus communication or the like. The control and/or regulation electronics 67 of the positioner 1 can also be provided with a user interface 69, such as a touch display or the like.

The electropneumatic positioner 1, in addition to the electrical field input 61, has a pneumatic field input 53. Via the pneumatic field input or supply input 53, the electropneumatic positioner 1 is connected to a pneumatic source 52, which can provide a pneumatic supply pressure signal p of, for example, 6 bar, 10 bar, or more to the positioner 1. The first or upstream modular pneumatic slot 11 has a pneumatic input interface 13a, which is pneumatically connected to the supply input 53 on the housing 71 of the positioner 1 in order to obtain the supply pressure signal p.

The positioner 1 has a housing 71 which receives the components of the positioner. The housing 71 can have a fluid-tight sealable cavity or inner chamber 73, in which among other things electric cables, pneumatic connection lines, in particular in the form of channel plates or channel pipes, and/or a microprocessor are housed. The field input 61 for the reference control signal w from a control room or the like, the pneumatic supply input 53 for supplying the positioner 1 with supply pressure p from a pneumatic source 52, a pneumatic control output 51 for operating a pneumatic actuator 3, and a sensor signal input for transmitting the instantaneous position x of the control valve 5 detected by the position sensor 56 are provided in the walls of the housing 71.

The slots, described in detail below, and the plug-in components inserted therein can be encapsulated in a fluid-tight manner by means of a cover which can be removably fastened, in particular screwed, to the housing 71 for protection against external influences. When replacing the modular plug-in components, the cover can be removed to allow the modular replacement procedure to be performed. The inner chamber 73 of the positioner can be separated from the supports for the modular slots by means of walls. In particular, the interior 73 of the positioner 1 can be separated from the supports for the slots in such a way that the inner chamber 73 remains sealed against the environment if a slot is unoccupied.

In an exemplary embodiment, the electropneumatic positioner 1 has, for example, two pneumatic plug-in or insertion slots 11, 21 of essentially the same structure that are freely accessible from the outside and can be optionally occupied by individual pneumatic components of different designs. The number of slots is not limited thereto and can the positioner 1 can include more or less slots as would be understood by one of ordinary skill in the arts. In an exemplary embodiment, a pneumatic component can be, for example, an I/P-converter, a pneumatically operated power generator, a valve component (e.g. 1 2/2-way valve, 3/2-way valve, or similar device), or another component as would be understood by one of ordinary skill in the relevant arts. In an exemplary embodiment, a pneumatic component can be implemented as a pneumatic connector, i.e. without valve functionality, for producing a connection line from the pneumatic input 13a (23a, 23c) to the pneumatic output 13b (13d, 23b, 23d) of the pneumatic slot. In an exemplary embodiment, a pneumatic connector can be configured with a throttle, for example, to create a significantly increased pneumatic fluid resistance in comparison with a simple channel. In an exemplary embodiment, a pneumatic connector can be optionally designed with or without sensors, for example, pressure sensors, temperature sensors or the like. A connector with integrated sensor technology can also be designated as a pneumatic sensor connector. Such a pneumatic sensor connector can be used to detect actual values with regard to the pneumatic fluid to make them available in particular to the open-loop and/or closed-loop control electronics 67 of the positioner 1.

In an exemplary embodiment, in the pneumatic slots 11, 21, pneumatic components of the same (or of different) functionality can be used. In exemplary embodiment, each slot is configured to house only a single pneumatic component, but is not limited thereto. The pneumatic slots 11, 21 are modularly matched in such a way that, depending on which predefined pneumatic component is inserted, the function of the inserted pneumatic component is guaranteed by the production of communication lines. Each individual pneumatic slot 11, 21 has a pneumatic input interface 13a or 23a via which the respective slot 11 or 21 can be supplied with pneumatic fluid from the direction of a pneumatic source 52.

In an exemplary embodiment, the pneumatic slots 11, 21 are connected in series such that the pneumatic connection from the pneumatic source 52 to the pneumatic drive chamber 57 of the pneumatic actuator is forced to first flow through the upstream pneumatic slot 11 and then through the downstream pneumatic slot 21, in order then to continue flowing to the pneumatic actuator 3.

In an exemplary embodiment, in the electropneumatic positioner 1, to transfer a supply pressure signal p via the supply input 53 of the positioner 1, the pneumatic source 52 is connected to the pneumatic input 13a of the pneumatic slot 11. The pneumatic component inserted in the pneumatic slot 11, which in the present case is implemented as an I/P-converter 31, includes a pneumatic input 33a which for pneumatic fluid transmission is connected in a sealed manner to the input 13a of the first pneumatic slot 11. The I/P-converter 31 is activated by the open-loop and/or closed-loop control electronics 67 with an electrical control signal s. In an exemplary embodiment, the I/P-converter 31 includes an electropneumatic signal transducer, which is configured to output a pneumatic control pressure signal S11 based on an electrical control signal s received by an open-loop and/or closed-loop control electronics 67. The electropneumatic signal transducer 31, as a function of the received electrical control signal s, controls the connection from the pneumatic input 33a to the pneumatic output 33b of the actuating signal transducer 31 to generate from the available supply pressure signal p a control pressure signal S11, with which the actuator 3 can be caused to bring the control valve 5 into a desired reference position. For transmitting the pneumatic control pressure, the pneumatic output 33b of the actuating signal transducer 31 is connected in a sealed manner to the pneumatic output 13b of the upstream pneumatic slot 11. The pneumatic inputs 13a, 33a and outputs 13b, 33b of the pneumatic slot 11 and the pneumatic component 31 form pneumatic interfaces of the slot 11 and the plugged-in pneumatic component 31, which in the plugged-in state of the pneumatic component merge into one another in a functionally and operationally secure manner to realize a pneumatic fluidic connection.

In an exemplary embodiment, the electropneumatic signal transducer 31 can be implemented, for example, as a 3/2-way valve, to create a control pressure signal S11 for the actuator 3, which is between the ambient pressure and the pressure of the pneumatic supply signal p.

The pneumatic output 13b of the first slot 11 is pneumatically connected to the pneumatic input 23a of the second, downstream pneumatic slot 21. The downstream external pneumatic slot 21 has a pneumatic output 23b, which is pneumatically in connection with the pneumatic working chamber 57 of the pneumatic actuator 3 via the pneumatic control output 51 of the positioner 1, in order to communicate the pneumatic control signal S51 to the actuator 3.

In an exemplary embodiment, in the second pneumatic slot 21, a pneumatic switching device in the form of an open/close valve 41 is inserted, which can either open and therefore release, or close and therefore disconnect (i.e. shut off) the pneumatic connection between the pneumatic input 23a and the pneumatic output 23b of the pneumatic slot 21. As long as the open/close valve 41 releases the pneumatic connection from the input 23a to the output 23b of the pneumatic slot 21, the pneumatic control pressure signal S51 corresponds substantially to the pneumatic control pressure signal S11, which comes from the output 13b of the first pneumatic slot 11. In the closed state of the open/close valve 41, the connection from the input 23a to the output 23b of the slot 21 is separated in such a way that the control pressure signal S51 at the control output 51 of the field device is independent of the pneumatic control pressure signal S11, which is output from the first pneumatic slot 1 in the direction of the actuator 3 and which in particular can be constant. If, for example, the pneumatic connection from the pneumatic source 52 to the first electropneumatic slot 11 is interrupted or if a leak occurs, which can result in a loss of pressure at the pneumatic supply input 53 of the position controller 1, the open/close valve 41 in the second pneumatic slot 21 can be moved into the closed safety position, so that a loss of pressure in the pneumatic drive chamber 57 of the drive 3 is prevented and the latter remains in its current position. In this way, it is ensured that even in the event of an unwanted pressure drop, no unwanted supply pressure drop occurs in the actuator 3, so that the actuator 3 is not unintentionally moved into a closed or open end position as a result of the pre-tensioning force of the return spring in the spring chamber 58 of the actuator. In an exemplary embodiment, an open/close valve 41 may be realized, for example, as a 2/2-way valve, but is not limited thereto.

The open/close valve 41 has one pneumatic input 43a and one pneumatic output 43b, each of which merges with the pneumatic input 23a or pneumatic output 43b respectively of the pneumatic slot 21, in which the open/close valve 41 is seated.

The state change, i.e. the switching of the switching device 41, can be triggered for example by an electrical emergency control signal from the open-loop and/or closed-loop control electronics 67 to the open/close valve 41. In an exemplary embodiment, the electropneumatic signal transducer is implemented for activation as a proportional valve including a piston slider with I/P-converter, for example with a baffle plate.

In the present example shown in FIG. 1, the pneumatic slots 11 and 21 are implemented as electropneumatic slots, which in addition to the pneumatic interfaces, also have at least one electrical interface 15, 25 each. The pneumatic components 31, 41 that are inserted in the pneumatic slots 11, 21 are embodied as electropneumatic components and have an electrical connector 35 or 45, which is configured to merge into the slot interface 15, 25 to form an electrical contact.

The open-loop and/or closed-loop control electronics 67 can be configured to output the emergency activation signal n to the downstream pneumatic interface 21 if the electronics 67 detects a fault, for example if a current threshold value of the reference control signal w is undershot at the field input 61 or at the analogue-digital converter 64 or the like, or if a pressure reading m falls below a certain threshold, or if the electronics 67 receives another signal, as a result of which the open-loop and/or closed-loop control electronics 67 is configured to output the emergency signal n for the second pneumatic slot 21.

It should be clear that an open/close valve can also be implemented as a purely pneumatic component, if appropriate at a purely pneumatic slot, without electrical contact and/or without electrical connection and/or without electrical components. For example, the open/close valve can have a supply pressure (measuring) input 43e, which is connected to a supply pressure (measuring) interface 23e of the downstream pneumatic slot 21, wherein the supply pressure (measuring) input 23e of the downstream pneumatic slot 21 is connected directly (without detours or series connection with the upstream pneumatic slot 11) to the supply pressure input 53 of the positioner 1.

The open/close valve can have a pneumatic switching actuator 47, such as a pilot valve or similar, which can cause the open/close valve 41 to occupy the closed or open position depending on the supply pressure signal p at the supply input 53 of the positioner. For example, a pneumatic switching actuator 47 of the on/off valve 41 can receive the supply pressure p via the supply pressure (measuring) interface 23 and if this falls below a minimum supply pressure threshold, force the open/close valve to occupy the closed position.

The electropneumatic positioner 1 according to the present disclosure can include, in addition to the at least two pneumatic slots 11, 21, at least one, two or more purely electrical electronic slots 63, 65, which have no pneumatic interfaces. Such electronic slots 63, 65 can be configured to accommodate identical or differently shaped plug-in components compared to the pneumatic slots. In an exemplary embodiment, the electronic slots 63, 65 have electronic interfaces 66, 76, which can be brought into engagement with corresponding electrical interfaces of electronic components 68, 78 in order to form an electrical contact between the inserted electronics components 68, 78 and the electronic interfaces 68, 78 occupied by the electronic components 63, 65. For example, a position detector with binary input and/or output or a forced venting communication module with binary input and/or output can be used as an electronics component 68 in an electronic slot 63.

In an exemplary embodiment, the electronic plug-in component 68, which occupies the electronic slot 63, can be an electronic forced venting communication module, which has at least one binary input. The binary input can be connected to a control room or a sensor for communicating an alarm or emergency state to the positioner 1. On receipt of an alarm or locking state signal, a locking signal a is sent by the electronic module 68 via the electronic interface 66 to the open-loop and/or closed-loop electronics 67, which sends the emergency control signal n to the open/close valve 41 in the most downstream pneumatic slot 21 to initiate the locking function thereof.

It is also conceivable that, for example, the electronic component 78, which occupies the electronic slot 65, includes a data memory and/or a logic circuit which, together with the open-loop and/or closed-loop control electronics 67, in particular a microcontroller, forms a controller, for example as a hardware and/or software controller, for implementing an emergency control function that also implements a blocking function or an emergency venting function at the same time. The electronic component 78 in the electronic slot 65 may exchange communication signals b with the open-loop and/or closed-loop control electronics 67, at least unidirectionally. In an exemplary embodiment, the electronic component 78 can include processor circuitry that is configured to perform one or more functions and/or operations of the electronic component 78.

In an exemplary embodiment, the electropneumatic positioner 1 can have one or more pressure sensors 55. In this example, a pressure sensor block 55, which includes individual pressure sensors, is shown in FIG. 1. In an exemplary embodiment, the pressure sensor block 55 has a supply pressure sensor which is pneumatically directly connected to the pneumatic supply input 53 to measure the supply pressure signal p. The pressure sensor block 55 can also have a pressure sensor for the pressure in the housing 71. The pressure sensor block 55 can alternatively or additionally include a pressure sensor for detecting the ambient pressure, or atmospheric pressure. In exemplary embodiment, the pressure sensor block 55 shown in FIG. 1 includes an intermediate pressure sensor that measures the pressure in the middle of the pneumatic series circuit, between the upstream pneumatic slot 11 and the downstream pneumatic slot 21. The second pressure sensor of the pressure sensor block 55 thus measures the pressure of the pneumatic control signal S11 which is output at the pneumatic output 13*b* for the pneumatic input 23*a*. The pressure sensor block 55 also has a pressure sensor that measures the pressure of the pneumatic control pressure signal S51 at the pneumatic control output. For the sake of simplicity, only one pressure measuring signal line for transmitting the measured pressure value m is shown between the pressure sensor block 55 and the open-loop and/or closed-loop control electronics 67. It should be clear, however, that each individual pressure sensor can have its own individual pressure measuring signal line, which connects the relevant pressure sensor to the open-loop and/or closed-loop control electronics 67.

If one of the pneumatic slots 11, 21 or at least one pneumatic interface of a pneumatic slot 11, 21 is not occupied, then this can be detected by the microprocessor 67, for example. As a result, the respective pneumatic input or output interface of the pneumatic slot 11, 21 can be closed (e.g. by the microprocessor 67 using a corresponding control signal or by an automatically operating closure device 16, 26).

The field device 102 according to the present disclosure shown in FIG. 2 with a positioner 101 according to the present disclosure differs from the field device 2 shown in FIG. 1 essentially in that the pneumatic actuator 103 of the field device 102 shown in FIG. 2 is a double-acting pneumatic actuator with two pneumatic working chambers 157*a*, 157*b*, in other words it includes no return spring. The positioner 101 according to the present disclosure in the design shown in FIG. 2 also includes a double series circuit with two pneumatic control outputs 151*a*, 151*b* provided in parallel with one another, for activating the double-acting pneumatic actuator 103. For ease of readability of the application, for the same or similar components of the field device 102 or of the positioner 101 of FIG. 2, the same or similar reference numbers of FIG. 1 are used, but increased by 100. The structure of the field device 2 or positioner 1 described above and the function description essentially apply substantially equally to the field device 102 or positioner 101.

The double-acting actuator 103 has a first pneumatic working chamber 157*a* and a second pneumatic working chamber 157*b*, which can be separated from each other in an airtight manner using a diaphragm. If a control signal pressure difference exists between pneumatic working chambers 157*a*, 157*b* separated by the membrane, an actuating force acts on the membrane and the drive rod or shaft connected thereto to activate the control valve 5. Each pneumatic working chamber 157*a*, 157*b* receives a pneumatic control pressure signal S51 or S151 assigned to it from a control pressure output 151*a* or 151*b* of the positioner 101 which is assigned to it. The first control pressure output 151*a* is part of a first pneumatic series circuit with two pneumatic slots 111, 121. With regard to the pneumatic control output 151, this first pneumatic series circuit functions in substantially the same way as the series circuit described above with regard to the field device 2 with the positioner 1.

The second pneumatic control pressure output 151*b* is also part of a pneumatic series circuit with two pneumatic slots. In the case of the present embodiment, the second control pressure output 151 includes the same pneumatic slots 111, 121 that also implement the series circuit with the first pneumatic control output, wherein the pneumatic slots 111, 121 are designed in such a way that the two series circuits as of the pneumatic input 13 of the upstream (in this case: most upstream) slot 111 act separately in parallel with one another. In exemplary embodiment, there is no interaction or cooperation between the series circuits.

The electropneumatic component 131 in the first pneumatic slot 111 is designed in such a way that a division is made starting from a first pneumatic input 33*a* of the pneumatic component 131, for example in the form of a T-junction, in particular with reverse flow check valves in two separate parallel pneumatic lines. The pneumatic component 131 can include two parallel I/P-converters, each of which is assigned an individual pneumatic output 33*b* or 33d, in order to output at a respective pneumatic interface 13b or 13d of the pneumatic slot 111 a pneumatic control pressure signal S11 or S111.

FIG. 2 illustrates an electropneumatic positioner 101 according to an exemplary embodiment having an upstream pneumatic slot 111 that includes an electronic interface 15 configured to connect an electronic interface 35 of the electropneumatic component 131. Via the interfaces 15, 35 of the upstream electropneumatic slot 111 and the modular pneumatic component 131 which occupies it, the latter can receive one or a plurality of electrical control signals s from the open-loop and/or closed-loop control electronics 67. Alternatively, the electropneumatic slot 111 and the electropneumatic component 131 seated therein can include additional (not shown) electronic interfaces for additional communication lines to the open-loop and/or closed-loop control electronics 67, in particular to activate each I/P-converter individually.

In an exemplary embodiment, the second pneumatic slot 121 is occupied with a pneumatic component 141, which contains an open/close valve. The open/close valve realizes two parallel pneumatic connection lines each with one pneumatic input 43a, 43c and one pneumatic output 43b, 43d. In the design shown, the dual-jet open/close valve of the electropneumatic component 141 has a release state in which the two parallel pneumatic connections for transferring one pneumatic control pressure signal Si or S51 each are open. Alternatively, the dual-jet open/close valve of the pneumatic component 141 can occupy a locking state in which both pneumatic connections are closed.

It should be clear that an electropneumatic positioner according to the present disclosure (not shown in detail), for example by using additional pneumatic slots, can implement different kinds of multiple series circuits. For example, a positioner (not shown in detail) could be equipped with four pneumatic slots, each of which forms a series connection, as described in relation to FIG. 1, so that completely different pneumatic components are provided for a first control pressure output 51 and for the second control pressure output 151. In accordance with another, alternative arrangement (not shown in detail), an electropneumatic double-actuating signal transducer corresponding to the pneumatic module 131, could be connected in series via its first pneumatic output 33b to a first pneumatic component as that described above designated with reference numeral 41, and the second pneumatic output 33d could be pneumatically connected in series to a second, additional pneumatic module, corresponding to that designated with reference numeral 41 as shown in FIG. 1. It should be clear that a corresponding pneumatic channel connection would have to be provided. It is also conceivable for a positioner to include two simple electropneumatic signal transducers, such as those designated with reference numeral 31, which are supplied in parallel with the supply pressure p at a respective input corresponding to 13a and which each have one output 13b, wherein the first of these transducers can be connected to a first input and the second of these transducers to a second input of a dual-jet open/close valve, as shown in the pneumatic module 141 (not shown in detail).

Apart from the dual-jet structure, the open/close valve 141 functions in substantially the same way as the single-jet open/close valve described above of the pneumatic component 41 described above. In exemplary embodiment, the dual-jet open/close valve of the electropneumatic module 141 is implemented as a 4/2-way valve.

In an exemplary embodiment, the pressure sensor block 155 is also designed in line with the above described pressure sensor block 55, namely for measuring pressure readings at different measuring points in the series circuits. The pressure sensor block 155 can detect independently of each other a first pressure measurement at the pneumatic supply input 53 of the positioner 101, two second pressure measurements in both the first and the second series circuit, and two third pressure measurements at both the first pneumatic control output 151a and at the second control output 151b. In an exemplary embodiment, individual pressure sensors are provided for each measuring point and/or individual pressure measurement signal lines for the open-loop and/or closed-loop control electronics 67 (not illustrated in detail).

It is applicable to all the position controllers 1, 101, etc. described above that the pneumatic connection channels can be realized, for example, by a pneumatic channel plate or pneumatic channel pipework provided in the positioner housing 71, 171.

The features disclosed in the present description, claims and the drawings can be of significance both individually and also in any desired combination for the implementation of the embodiments of the present disclosure.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Two or more embodiments may be combined even if such combination is not explicitly described, and it is within the knowledge of one skilled in the art to make such a combination.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. An electropneumatic positioner for a pneumatic actuator to operate a control device of a processing plant, comprising:
    two modular pneumatic slots configured to engage with a respective modular pneumatic component, the two pneumatic slots and the pneumatic components being modularly matched to one another such that their respective pneumatic interfaces merge into one another when a pneumatic slot is engaged, and
    a pneumatic control output configured to output a pneumatic control pressure signal to the pneumatic actuator, the two modular pneumatic slots and the pneumatic control output forming a pneumatic series connection, wherein a downstream pneumatic slot of the two pneumatic slots is engaged with a pneumatic switching device that is configured to operate in either a release state, in which the pneumatic switching device provides a pneumatic connection to transmit the pneumatic control pressure signal between at least one upstream pneumatic slot of the two pneumatic slots and the pneumatic control output, and a locked state in which the pneumatic switching device is configured to seal off the pneumatic connection.

2. The electropneumatic positioner according to claim 1, wherein the pneumatic switching device is configured to operate in the locked state in response to an error state or alarm state of a field device, the electropneumatic positioner, the actuator and/or the actuator part.

3. The electropneumatic positioner according to claim 1, characterized in that the pneumatic switching device includes a pressure relieving slider or a poppet valve for achieving the locked state or the release state and/or in that the pneumatic switching device includes at least one soft-sealing sealing component such as an elastomer seal or a thermoplastic seal for realizing the locked state.

4. The electropneumatic positioner according to claim 1, wherein the pneumatic switching device is configured such that in the release state, the pneumatic connection is released such that in the pneumatic switching device, a connection channel with a cross section is provided to allow the pneumatic control pressure signal to pass un-throttled, the cross section being not more than 20%, 10%, or 5% larger than necessary to allow the pneumatic control pressure signal to pass un-throttled.

5. The electropneumatic positioner according to claim 1, wherein the pneumatic switching device is configured to continuously detect the actual position of a blocking element of the switching device.

6. The electropneumatic positioner according to claim 5, wherein the blocking element is a slider or a valve member.

7. The electropneumatic positioner according to claim 5, wherein the pneumatic switching device is configured to continuously detect the actual position of the blocking element with a position sensor.

8. The electropneumatic positioner according to claim 1, wherein the pneumatic series connection upstream of the pneumatic control output is ventable exclusively at an upstream pneumatic slot of the two pneumatic slots.

9. The electropneumatic positioner according to claim 1, wherein an upstream pneumatic slot of the two pneumatic slots is occupied with an electropneumatic signal transducer that is configured to emit the pneumatic control signal to control the actuator.

10. The electropneumatic positioner according to claim 1, further comprising:
    a pneumatic supply input configured to provide a pneumatic supply pressure signal to the pneumatic series connection to control an electropneumatic signal transducer; and/or
    an electric field input configured to receive a supply current and/or an electric positioning signal to control the electropneumatic signal transducer.

11. The electropneumatic positioner according to claim 1, further comprising:
    a modular electronics slot configured to engage with a respective modular electronic component, the modular electronics slot and the respective modular electronic component being modularly matched to one another such that their respective electronic interfaces merge into one another when the modular electronics slot is occupied.

12. The electropneumatic positioner according to claim 1, further comprising a pressure sensor configured to:
    detect at least one pressure value in the pneumatic series connection of: the pneumatic control pressure signal at the control output of the pneumatic series connection, and/or the pneumatic control pressure signal in the pneumatic series connection between an upstream pneumatic slot and a downstream pneumatic slot of the two pneumatic slots; and a generate pressure signal at the pneumatic supply input of the pneumatic series connection based on the detection of the at least one pressure value.

13. The electropneumatic positioner according to claim 1, further comprising:
a housing that includes the pneumatic control output, and in which the series connection including the two modular pneumatic slots is accommodated.

14. The electropneumatic positioner according to claim 13, wherein the housing further comprises the electrical field input and/or the pneumatic supply input.

15. The electropneumatic positioner according to claim 1, wherein the modular pneumatic component includes an electropneumatic transducer.

16. The electropneumatic positioner according to claim 1, wherein the pneumatic switching device is an open/close valve.

17. An electropneumatic field device, comprising:
an electropneumatic positioner according to claim 1, wherein the pneumatic actuator is connected to the control output.

18. The electropneumatic field device according to claim 17, wherein the pneumatic field device upstream from the pneumatic actuator is operationally ventable exclusively at an upstream pneumatic slot of the two pneumatic slots.

19. The electropneumatic field device according to claim 17, wherein the pneumatic actuator is a single-acting or double-acting pneumatic actuator.

* * * * *